US009089795B2

(12) United States Patent
Salvador et al.

(10) Patent No.: US 9,089,795 B2
(45) Date of Patent: *Jul. 28, 2015

(54) FLUID FILTER SYSTEM

(71) Applicants: CATERPILLAR INC., Peoria, IL (US); DONALDSON COMPANY, INC., Minneapolis, MN (US); ADVANCED FILTRATION SYSTEMS, INC., Champaign, IL (US)

(72) Inventors: Christopher J. Salvador, Peoria, IL (US); Randall W. Heibenthal, Mahomet, IL (US); Dennis M. Deedrich, Champaign, IL (US); David B. Harder, Burnsville, MN (US); John R. Hacker, Minneapolis, MN (US); Richard J. Eisenmenger, Philo, IL (US)

(73) Assignees: Caterpillar Inc., Peoria, IL (US); Advanced Filtration Systems, Inc., Champaign, IL (US); Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,813

(22) Filed: Aug. 23, 2013

(65) Prior Publication Data

US 2013/0334147 A1    Dec. 19, 2013

Related U.S. Application Data

(63) Continuation of application No. 13/568,945, filed on Aug. 7, 2012, now Pat. No. 8,540,080, which is a continuation of application No. 11/984,503, filed on Nov. 19, 2007, now Pat. No. 8,272,516.

(51) Int. Cl.
*B01D 27/00*   (2006.01)
*B01D 35/28*   (2006.01)
(Continued)

(52) U.S. Cl.
CPC .............. *B01D 27/106* (2013.01); *B01D 29/21* (2013.01); *B01D 35/30* (2013.01); *B01D 2201/295* (2013.01); *B01D 2201/304* (2013.01); *B01D 2201/34* (2013.01)

(58) Field of Classification Search
None
See application file for complete search history.

(56) References Cited

U.S. PATENT DOCUMENTS

| 2,621,796 A | 12/1952 | Wilkinson |
| 3,166,498 A | 1/1965 | Otto, Jr. |

(Continued)

FOREIGN PATENT DOCUMENTS

| DE | 1933283 A1 | 1/1971 |
| DE | 4124322 A1 | 1/1995 |

(Continued)

OTHER PUBLICATIONS

English Abstract for DE-4124322 A1 from esp@cenet database (1 page).

(Continued)

*Primary Examiner* — Benjamin Kurtz
(74) *Attorney, Agent, or Firm* — Finnegan, Henderson, Farabow, Garrett & Dunner, LLP

(57) ABSTRACT

An endcap including a first plate member including a radial inner portion, a radial outer portion, and defining a longitudinal axis. The endcap also includes a flange disposed between the radial inner and outer portions of the first plate member and projecting axially along the longitudinal axis in a first direction. The endcap also includes a first seal member disposed adjacent the flange. The first seal includes a first portion thereof engaged with an axial facing surface of the first plate member and a second portion thereof engaged with a radially facing surface of the flange. The endcap further includes a second plate member disposed radially outward of the radial outer portion and a second seal member disposed adjacent the second plate member including at least a portion thereof axially spaced from the axially facing surface of the first plate member in a second direction along the longitudinal axis opposite the first direction.

23 Claims, 2 Drawing Sheets

(51) Int. Cl.
  *B01D 29/88* (2006.01)
  *B01D 27/10* (2006.01)
  *B01D 29/21* (2006.01)
  *B01D 35/30* (2006.01)
  *F01M 11/03* (2006.01)
  *B01D 27/06* (2006.01)
  *B01D 29/07* (2006.01)

(56) References Cited

U.S. PATENT DOCUMENTS

| | | |
|---|---|---|
| 3,224,591 A | 12/1965 | Sawyer |
| 3,369,666 A | 2/1968 | Hultgren et al. |
| 4,172,795 A | 10/1979 | Kurtz et al. |
| 4,298,465 A | 11/1981 | Druffel |
| 4,502,956 A | 3/1985 | Wilson et al. |
| 4,721,563 A | 1/1988 | Rosaen |
| 4,906,365 A | 3/1990 | Baumann et al. |
| 4,948,503 A | 8/1990 | Baumann et al. |
| 5,035,797 A | 7/1991 | Janik |
| 5,098,559 A | 3/1992 | Mack et al. |
| 5,203,994 A | 4/1993 | Janik |
| 5,300,223 A | 4/1994 | Wright |
| 5,302,284 A | 4/1994 | Zeiner et al. |
| 5,312,546 A | 5/1994 | Janik |
| 5,342,519 A | 8/1994 | Friedmann et al. |
| 5,366,400 A | 11/1994 | Kucik |
| 5,374,355 A | 12/1994 | Habiger et al. |
| 5,458,767 A | 10/1995 | Stone |
| 5,474,676 A | 12/1995 | Janik et al. |
| 5,484,527 A | 1/1996 | Janik et al. |
| 5,489,384 A | 2/1996 | Janik et al. |
| 5,525,225 A | 6/1996 | Janik et al. |
| 5,538,626 A | 7/1996 | Baumann |
| 5,548,893 A | 8/1996 | Koelfgen |
| 5,578,221 A | 11/1996 | Janik |
| 5,584,987 A | 12/1996 | Mules |
| 5,660,726 A | 8/1997 | Dluzik |
| 5,660,729 A | 8/1997 | Baumann |
| 5,660,771 A | 8/1997 | Dunfee et al. |
| 5,685,985 A | 11/1997 | Brown et al. |
| 5,688,396 A | 11/1997 | Baumann et al. |
| 5,695,633 A | 12/1997 | Ernst et al. |
| 5,698,098 A | 12/1997 | Ernst et al. |
| 5,702,602 A | 12/1997 | Brown et al. |
| 5,718,825 A | 2/1998 | Greive et al. |
| 5,738,785 A | 4/1998 | Brown et al. |
| 5,753,116 A | 5/1998 | Baumann et al. |
| 5,753,120 A * | 5/1998 | Clausen et al. ............... 210/438 |
| 5,770,054 A | 6/1998 | Ardes |
| 5,770,065 A | 6/1998 | Popoff et al. |
| 5,772,881 A | 6/1998 | Stockhowe et al. |
| 5,779,903 A | 7/1998 | Smith et al. |
| 5,785,850 A | 7/1998 | Lynch et al. |
| 5,817,232 A | 10/1998 | Roll et al. |
| 5,858,227 A | 1/1999 | Stone et al. |
| 5,888,383 A | 3/1999 | Cox |
| 5,904,844 A | 5/1999 | Stone |
| 5,922,196 A | 7/1999 | Baumann |
| 5,922,199 A | 7/1999 | Hodgkins |
| 5,928,511 A | 7/1999 | Messner et al. |
| 5,935,481 A | 8/1999 | Dunfee et al. |
| 5,972,210 A | 10/1999 | Münkel |
| 6,015,492 A | 1/2000 | Popoff et al. |
| 6,016,923 A | 1/2000 | Baumann |
| 6,045,693 A | 4/2000 | Miller et al. |
| 6,058,899 A | 5/2000 | Schetter |
| 6,068,762 A | 5/2000 | Stone et al. |
| 6,090,283 A | 7/2000 | Schumann et al. |
| 6,113,781 A | 9/2000 | Popoff et al. |
| 6,173,859 B1 | 1/2001 | Schumann et al. |
| 6,174,438 B1 | 1/2001 | Hodgkins et al. |
| 6,177,003 B1 | 1/2001 | Jainek et al. |
| 6,187,191 B1 | 2/2001 | Koivula et al. |
| 6,224,758 B1 | 5/2001 | Jainek et al. |
| 6,227,381 B1 | 5/2001 | Koivula |
| 6,248,236 B1 | 6/2001 | Hodgkins |
| 6,322,697 B1 | 11/2001 | Hacker et al. |
| 6,471,070 B2 | 10/2002 | Janik |
| 6,485,637 B2 | 11/2002 | Jainek et al. |
| 6,506,302 B2 | 1/2003 | Janik |
| 6,514,404 B1 | 2/2003 | Bauer |
| 6,517,710 B2 | 2/2003 | Hartmann et al. |
| 6,554,140 B2 | 4/2003 | Steger, Jr. et al. |
| 6,569,326 B1 | 5/2003 | Baumann et al. |
| 6,579,448 B2 * | 6/2003 | Dworatzek ............... 210/130 |
| 6,591,807 B1 | 7/2003 | Ardes |
| 6,605,210 B2 | 8/2003 | Reinhardt |
| 6,607,665 B2 | 8/2003 | Fick et al. |
| 6,610,203 B1 | 8/2003 | Jainek |
| 6,626,299 B1 | 9/2003 | Brown et al. |
| 6,685,829 B1 | 2/2004 | Baumann et al. |
| 6,709,588 B2 | 3/2004 | Pavlin et al. |
| 6,729,477 B2 | 5/2004 | Yates |
| 6,740,234 B1 | 5/2004 | Williams et al. |
| 6,972,092 B1 | 12/2005 | Roll |
| 6,974,539 B1 * | 12/2005 | McKenzie ............... 210/136 |
| 6,988,625 B2 | 1/2006 | Thomas et al. |
| 7,014,761 B2 | 3/2006 | Merritt et al. |
| 8,540,080 B2 * | 9/2013 | Salvador et al. ............. 210/443 |
| 2002/0158006 A1 | 10/2002 | Thomas |
| 2003/0098269 A1 | 5/2003 | Ardes |
| 2003/0226790 A1 | 12/2003 | Brown et al. |
| 2003/0226800 A1 | 12/2003 | Brown et al. |
| 2006/0091064 A1 | 5/2006 | Brown et al. |
| 2006/0096934 A1 * | 5/2006 | Weinberger et al. ......... 210/791 |
| 2006/0118476 A1 | 6/2006 | Weindorf |
| 2007/0181481 A1 | 8/2007 | Reynolds et al. |
| 2008/0308481 A1 | 12/2008 | Wieczorek et al. |
| 2010/0032359 A1 | 2/2010 | Gillenberg et al. |
| 2010/0170842 A1 | 7/2010 | Knickmann et al. |

FOREIGN PATENT DOCUMENTS

| | | |
|---|---|---|
| EP | 0 844 012 A2 | 5/1998 |
| EP | 1 009 512 A1 | 6/2000 |
| EP | 2 107 928 B1 | 5/2010 |
| FR | 2762230 A1 | 10/1998 |
| JP | H09173716 A | 7/1997 |
| WO | WO 2007/094978 A2 | 8/2007 |
| WO | WO 2008/157597 A2 | 12/2008 |

OTHER PUBLICATIONS

Specification Data Sheet for Baldwin Filters, 2004 (2 pages).
Illustration of Fluid Filter (1 page), At least as early as Nov. 18, 2006.

* cited by examiner

FLUID FILTER SYSTEM

This application is a continuation of U.S. patent application Ser. No. 13/568,945, filed Aug. 7, 2012, still pending, which is a continuation of U.S. patent application Ser. No. 11/984,503, filed Nov. 19, 2007, now U.S. Pat. No. 8,272,516, issued Sep. 25, 2012, the benefit of priority of both of which is claimed, and the disclosures of both of which are incorporated herein by reference.

TECHNICAL FIELD

The present disclosure relates to filters and, more particularly, to fluid filter systems.

BACKGROUND

Cartridge style fluid filters, such as, for example, fuel or lubricant filters associated with an engine, typically include a replaceable filter element contained within a canister that is threadingly engaged to the engine. Unfiltered fluid, e.g., fuel or lubricant, is received by the filter via an inlet port, particulates are removed from the unfiltered fluid via the filter element, and filtered fluid is delivered to the engine via an outlet port. The filter element often includes a generally cylindrical filter medium, e.g., fabric or other porous material, supported within the canister via one or more endcaps, such that unfiltered fluid flows through the filter medium in a generally radial direction. An endcap typically supports and/or positions the filter medium within the canister and with respect to the inlet and outlet ports. Fluid filters usually also include one or more seals that sealingly separate the inlet and outlet ports to reduce or eliminate unfiltered fluid from bypassing the filter medium.

Typically, the filter elements of such fluid filters are frequently replaced to reduce pressure drop across the filter medium, avoid deterioration of the seals, and/or otherwise attempt to ensure the fluid filter operates as desired. To replace a filter element, the canister is usually unthreaded from the engine, the seals between the inlet and outlet flows are unseated, the old filter element is removed from the canister, a new filter element is inserted, and the canister is rethreaded on the engine. An operator replacing a filter cartridge might prime the canister with fluid to avoid and/or reduce entrapped air within the fluid system. This priming fluid is often previously used and/or unfiltered fluid and priming the canister may require great care to avoid priming fluid from being placed on the downstream side, i.e., the filtered fluid side, of the filter medium. Additionally, proper reseating of the seals, either the old seals or new seals, during filter cartridge replacement is desirable to provide sufficient sealing between the inlet and outlet ports and, thus, to reduce unfiltered fluid from bypassing the filter medium. Unfiltered and/or priming fluid downstream of the filter medium, either from insufficient sealing and/or from operator priming, may result in damage to one or more engine components during operation.

U.S. Pat. No. 6,554,140 ("the '140 patent") issued to Steger, Jr. et al. discloses a filter assembly including an outer seal that forms a seal between an outer shell and a filter base and an inner seal that forms a seal between an endcap and the filter base. The filter assembly is threadingly attached to the filter base via a nutplate that compresses the outer seal against the filter base. The filter assembly also includes a filter element wherein unfiltered fluid flows from an unfiltered fluid passageway to a radial space between the outer shell and the filter element, unfiltered fluid flows through the filter element into an inner passageway, and the resulting filtered fluid flows into a filtered fluid passageway.

The '140 patent may provide a seal between the filter assembly and the filter base with the outer seal and may provide a seal to minimize fluid leakage at a connection between the filtered fluid passageway and the inner passage with the inner seal. The '140 patent may, however, require numerous components to achieve these seals, complicating the assembly and alignment that may require precise manufacturing tolerances thereof and/or potential reduce the sufficiency of the seal. Additionally, reconnecting the filter assembly of the '140 patent to the filter base, and the seating of the inner and outer seals, may require a unique nutplate with specialized geometry to ensure proper alignment thereof with the filter base and proper resealing and reconnection of the filter assembly.

The present disclosure is directed to overcoming one or more of the shortcomings set forth above.

SUMMARY OF THE INVENTION

In one aspect, the present disclosure is directed to an endcap. The endcap includes a first plate member including a radial inner portion, a radial outer portion, and defining a longitudinal axis. The endcap also includes a flange disposed between the radial inner and outer portions of the first plate member and projecting axially along the longitudinal axis in a first direction. The endcap also includes a first seal member disposed adjacent the flange. The first seal includes a first portion thereof engaged with an axial facing surface of the first plate member and a second portion thereof engaged with a radially facing surface of the flange. The endcap further includes a second plate member disposed radially outward of the radial outer portion and a second seal member disposed adjacent the second plate member including at least a portion thereof axially spaced from the axially facing surface of the first plate member in a second direction along the longitudinal axis opposite the first direction.

In another aspect, the present disclosure is directed to an apparatus for sealingly connecting a filter medium to a filter system including a base, a container, and an outlet. The endcap includes a body including a substantially ring shaped first wall portion having radial inner portion, a radial outer portion, and a longitudinal axis. The apparatus also includes a first seal member configured to establish a first radially facing seal interface with respect to a first radially facing surface associated with the outlet and having at least a portion thereof disposed a first axial distance from the filter medium. The apparatus also includes a second seal member configured to establish a radially facing seal interface with respect to a second radially facing surface associated with the base and being disposed a second axial distance from the filter medium. The second axial distance is less than the first axial distance.

In another aspect, the present disclosure is directed to a filter assembly. The filter assembly includes a filter defining a longitudinal axis. The filter assembly also includes a first seal member configured to establish a first radially facing seal interface. At least a portion of the first seal member is axially spaced from the filter a first distance. The filter assembly further includes a second seal member configured to establish a second radially facing seal interface radially outward of the first radially facing seal interface. The second seal member is axially spaced from the filter a second axial distance. The second axial distance is less than the first axial distance.

In yet another aspect, the present disclosure is directed to a filter system. The filter system includes a base having an inlet port, an outlet port, and a longitudinal axis. The outlet port is disposed radially inward of the inlet port with respect to the longitudinal axis. The filter system also includes a container threadingly connected to the base. The filter system also includes a filter medium disposed radially within the container with respect to the longitudinal axis. The filter system further includes an endcap including a first wall member having a substantially ring shape and at least one aperture disposed radially outward of the first wall member. The filter system also includes a first seal member connected to the endcap and configured to be radially compressed against at least a portion of the base. The filter system further includes a second seal member connected to the endcap and configured to be radially compressed against the outlet port.

DETAILED DESCRIPTION

Figure 1:
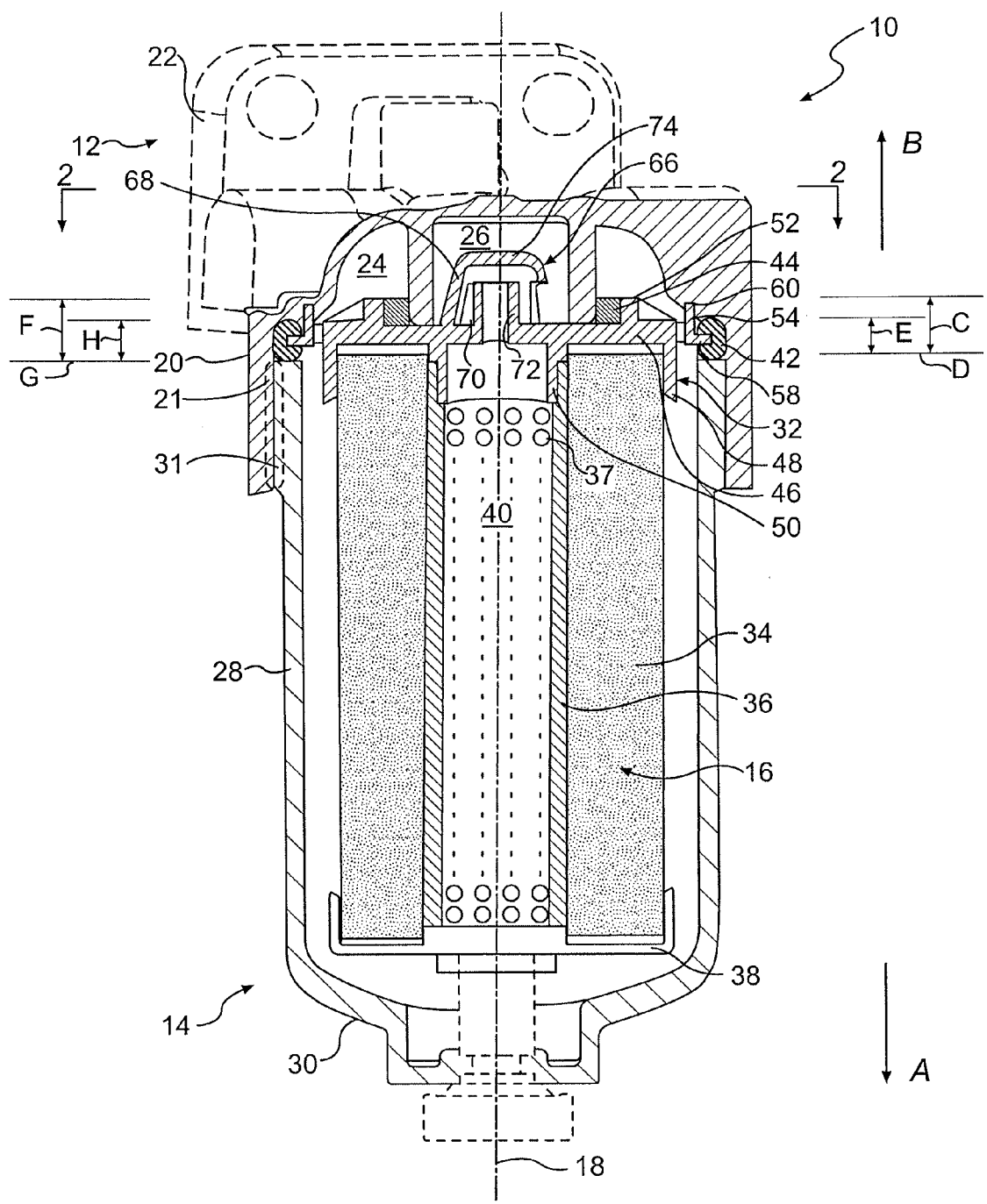
FIG. 1 is a diagrammatic sectional illustration of an exemplary fluid filter in accordance with the present disclosure.

FIG. 1 illustrates an exemplary fluid filter system 10. Fluid filter system 10 may include a base 12, a container 14, a filter assembly 16, and a longitudinal axis 18. Filter system 10 may be one of several components within a fluid system (not shown) and may be configured to receive unfiltered fluid from one or more upstream components of the fluid system, trap particles suspended within the unfiltered fluid, i.e., filter the fluid, and provide filtered fluid to one or more downstream components of the fluid system. The fluid system may include any type of fluid system, e.g., a fuel delivery system, a lubricating system, and/or a coolant system, and may or may not be operatively associated with an engine (not shown). Additionally, fluid filter system 10 may be configured to filter any type of fluid, such as, for example, gasoline, diesel fuel, lubricating oil, water, coolant, and/or any other type of fluid. It is contemplated that the fluid of the fluid system may or may not be pressurized and, if so, may be at any pressure.

Base 12 may include an outer wall 20 and a mounting portion 22. Outer wall 20 may be substantially cylindrical in shape and may include internal threads 21 configured to threadingly engage external threads 31 included on container 14. Mounting portion 22 may be configured to connect fluid filter system 10 to, for example, an engine, via one or more bolt holes (not referenced). Base 12 may further define an inlet port 24 and an outlet port 26. Inlet port 24 may be configured to receive unfiltered fluid from one or more upstream components of the fluid system and may be configured to direct the unfiltered fluid toward filter assembly 16. Specifically, inlet port 24 may include a generally annular space within base 12 and with respect to longitudinal axis 18. Outlet port 26 may be configured to receive filtered fluid from filter assembly 16 and configured to direct the filtered fluid toward one or more downstream components of the fluid system. Specifically, outlet port 26 may include a generally cylindrical space with respect to longitudinal axis 18 and may be disposed radially within inlet port 24. It is contemplated that inlet and outlet ports 24, 26 may each define a space within base 12 having any shape and/or contour, e.g., multifaceted.

Container 14 may include an outer wall 28 and an endwall 30. Outer wall 28 may be substantially cylindrical in shape and may include external threads 31 configured to threadingly engage internal threads 21 included on base 12. Endwall 30 may be disposed at an end of outer wall 28 opposite external threads 31. Outer wall 28 and endwall 30 may generally define an internal cavity configured to contain filter assembly 16. It is contemplated that internal threads 21 and external threads 31 may each, respectively, extend in either a clockwise or counter-clockwise direction. It is also contemplated that container 14 may include any conventional drain port (not referenced) that may be configured to facilitate draining of fluid from container 14 and/or may include any conventional relief valve (not shown) to limit a pressure of the fluid of the fluid system. It is understood that the engagement between internal threads 21 and external threads 31 and the resulting frictional engagement therebetween are well known in the art and, thus, are not further described.

Filter assembly 16 may include a first endcap 32 and a filter medium 34. First endcap 32 may be disposed adjacent base 12 and may be configured to support filter medium 34 within, and with respect to, container 14 and to provide seals between base 12 and container 14 and between inlet port 24 and outlet port 26, respectively. Filter medium 34 may be configured to trap particulates and/or other particles suspended within a fluid and may include a generally cylindrical shape disposed about and extending along longitudinal axis 18. Filter assembly 16 may also include a sleeve 36 and a second endcap 38. Sleeve 36 may include a generally cylindrical tube disposed radially within or radially outside of filter medium 34 and may include one or more perforations 37 therein configured to allow fluid to flow therethrough, e.g., from filter medium 34 to an interior space 40 (as illustrated in FIG. 1). A first end of sleeve 36, disposed adjacent base 12, may be engaged with, i.e., contact, first endcap 32 and a second end of sleeve 36, disposed adjacent end wall 30 of container 14, may be engaged with, i.e., contact, second endcap 38. Second endcap 38 may be disposed adjacent end wall 30 of container 14 and may be configured to support filter medium 34 within, and with respect to, container 14. It is contemplated that second endcap 38 may engage an interior surface of outer wall 28 and/or end wall 30 of container 14. It is also contemplated that filter medium 34 may include any filter material and/or medium known in the art, such as, for example, fabric or other porous material, and may or may not be pleated. It is also contemplated that first and second endcaps 32, 38 and sleeve 36 may be made from any suitable material, such as, for example, a polymer or other plastic, and may be injection molded. It is further contemplated that perforations 37 may include any shape, size, and/or quantity and that sleeve 36 may be selectively omitted.

Figure 2:
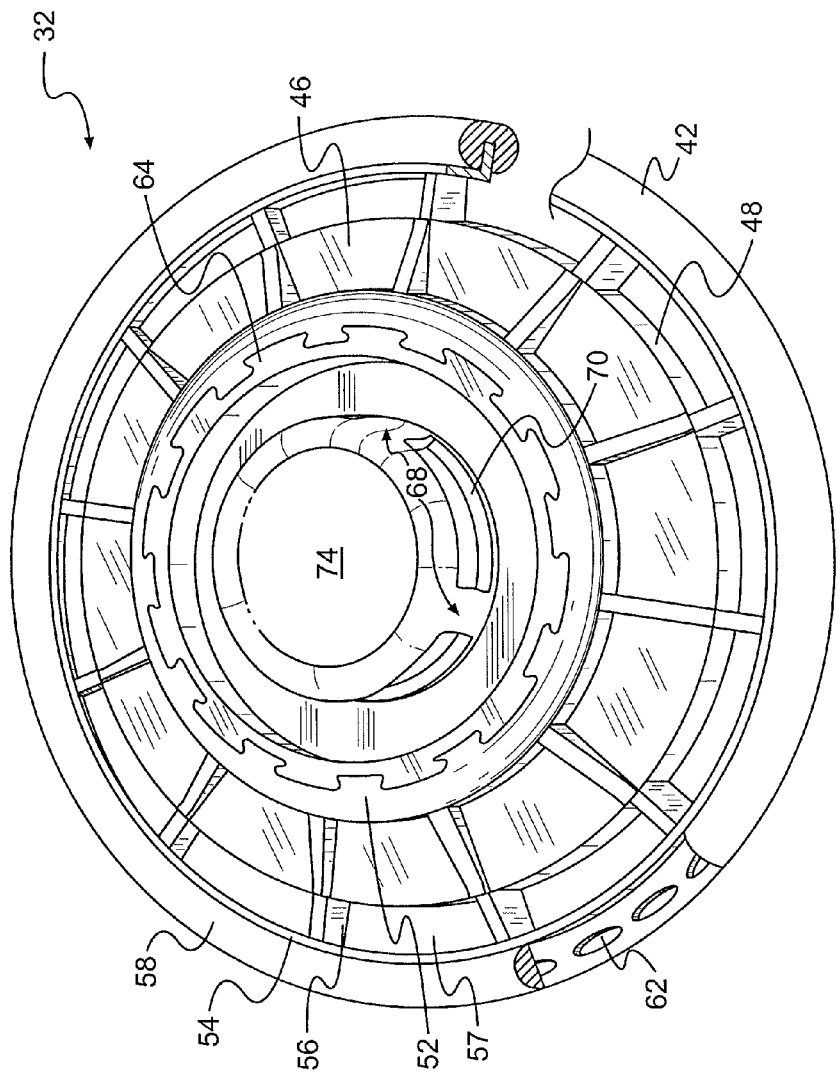
FIG. 2 is a diagrammatic illustration of an exemplary endcap of the fluid filter of FIG. 1.

With reference to FIGS. 1 and 2, first endcap 32 may include an outer seal member 42 configured to provide a fluid seal between base 12 and container 14 and an inner seal member 44 configured to provide a fluid seal between inlet port 24 and outlet port 26. Specifically, first endcap 32 may include a body having a generally ring shaped first wall 46, a generally cylindrically shaped second wall 48 disposed adjacent a radially outer portion, e.g., an outer edge, of first wall 46, and a generally cylindrically shaped third wall 50 disposed adjacent a radially inner portion, e.g., an inner edge, of first wall 46. First wall 46 may include a plate shape generally perpendicular to axis 18. Second and third walls 48, 50 may generally extend along, i.e., may be generally parallel to, longitudinal axis 18 in a direction A, e.g., toward end wall 30 of container 14. First endcap 32 may also include a generally cylindrical flange 52 disposed between the inner and outer portions of first wall 46 and generally extending along longitudinal axis 18 in a direction B substantially opposite direction A, e.g., away from end wall 30 of container 14. First endcap 32 may also include a generally cylindrically shaped fourth wall 54 disposed radially outward from first wall 46 via a plurality of arms 56 (as more clearly shown in FIG. 2) and generally extending along longitudinal axis 18 in direction A. Arms 56 may include any shape, length, and/or quantity and may define apertures 57, including any shape, length, and/or quantity, between adjacent ones thereof. First endcap 32 may also include a generally ring shaped fifth wall 58 generally extending radially outward from a first end of fourth wall 54 in a direction generally perpendicular to axis 18. A second end of fourth wall 54 may be configured to fit within a groove 60 formed within an inner surface of base 12. It is contemplated that groove 60 may be substantially complimentary in shape to the circumferential shape of fourth wall 54. It is also contemplated that an axial end of outlet port 26, disposed adjacent endcap 32, may contact first wall 46 at a location radially within flange 52, i.e., radially closer to axis 18, and may include a chamfer, a fillet, a taper on an inner and/or outer surface, and/or include any other shape configured to permit inner seal member 44 to move past the axial end of outlet port 26 when, for example, an operator replaces filter assembly 16 as will be described in more detail below. It is further contemplated that endcap 32 may or may not be fixedly connected to filter medium 34 and/or may include any apparatus configured to establish fluid seals with respect to base 12 and outlet port 26, such as, for example, an adaptor configured to interconnect a top-plate and/or another endcap to base 12 via a threaded connection.

Outer seal member 42 may be disposed adjacent and configured to surround the radially outermost edge of fifth wall 58 and may be integral with fifth wall 58 and, thus, first endcap 32. Specifically, outer seal member 42 may be configured to provide a fluid seal with respect to base 12 and container 14 and, thus an external environment, as a result of being compressed between an axially facing surface of base 12 and an axially facing surface of container 14. An axial facing surface may, for example, include a surface that is not predominantly parallel to axis 18, e.g., a surface that may be generally perpendicular to axis 18. Outer seal member 42 may include a circumferential outer surface having first and second portions thereof respectively configured to establish axially facing seal interfaces with respect to, for example, the axially facing surface of base 12 and the axial facing surface of container 14. In addition, base 12 may include a depression (not referenced) on an interior surface thereof configured to be complimentary to the shape of outer seal member 42.

Inner seal member 44 may be disposed radially inward of flange 52 and radially outward of outlet port 26 and may be integral with flange 52 and, thus, first endcap 32. Specifically, inner seal member 44 may be configured to provide a fluid seal between inlet and outlet ports 24, 26 as a result of being compressed between a radially facing inner surface of flange 52 and a radially facing outer surface of outlet port 26. A radially facing surface may, for example, include a surface that is not predominantly perpendicular to axis 18, e.g., a surface that may be generally parallel to axis 18. Inner seal member 44 may include a circumferential outer surface having first and second portions thereof respectively configured to engage an axially facing surface of first wall 46 and a radially facing surface of flange 52. In addition, the circumferential outer surface of inner seal member 44 may include a third portion thereof configured to establish a radially facing seal interface with respect to outlet port 26. It is contemplated that flange 52 may at least partially surround at least a portion of outlet port 26 and inner seal member 44, respectively, such that inner seal member 44 may be compressed therebetween and flange 52 may help maintain the radially facing seal interface established by inner seal member 44 by resisting movement of inner seal member 44 radially outward and away from outlet port 26 that may be cause by, for example, forces generated by fluid communicated from inlet port 24 impinging inner seal member 44.

At least a portion of inner seal member 44 may axially extend along longitudinal axis 18, in direction B, an axial distance greater than outer seal member 42 may axially extend along longitudinal axis 18, in direction B. That is, at least a portion of inner seal member 44 may extend a first axial distance C along longitudinal axis 18 from a first end of filter medium 34 (represented as line D in FIG. 1), outer seal member 42 may extend a second axial distance E along longitudinal axis 18 from the first end of filter medium 34 (line D), and first axial distance C may be greater than second axial distance E. Additionally, at least a portion of inner seal member 44 may extend a first axial distance F along longitudinal axis 18 from an axial end surface of container 14 (represented as line G in FIG. 1), outer seal member 42 may extend a second axial distance H along longitudinal axis 18 from the axial end surface of container 14 (line G), and first axial distance F may be greater than second axial distance H. As such, the axial relation between outer and inner seal members 42, 44 and the body of first endcap 32 might improve and/or assist in directing fluid flow from inlet port 24 toward openings 57 and then toward filter medium 34 while maintaining suitable sealing between inlet and outlet ports 24, 26.

It is contemplated that both outer and inner seal members 42, 44 may be generally cylindrically shaped about longitudinal axis 18 and may include any cross sectional shape, e.g., outer seal member 42 may include a substantially oval or round shape and/or inner seal member 44 may include a substantially square or rectangular shape. It is also contemplated that outer seal member 42 may be compressed as a function of the axial distance between the axially facing end surfaces of base 12 and container 14 when threadingly engaged and that inner seal member 44 may be compressed as a function of the radial distance between the radially facing inner surface of flange 52 and the radially facing outer surface of outlet port 26. It is also contemplated that outer seal member 42 may establish axially facing seal interfaces, e.g., a seal interface that substantially blocks fluid from flowing along an axial facing surface, with respect to base 12 and/or container 14 as well as a radially facing seal interface, e.g., a seal interface that substantially blocks fluid from flowing along a radially facing surface, with respect to base 12 and that inner seal member 44 may establish radially facing seal interfaces with respect to flange 52 and/or outlet port 26 as well as being void of any axially facing seal interfaces. It is further contemplated that inner seal member 44 may be radially compressed and may be axially expanded, displaced, or skewed as a result of being radially compressed, but might not be axially compressed, i.e., void of axial compression. It is further contemplated that outer seal member 42 may be axially compressed with respect to base 12 at any radial location with respect to inner seal member 44. As such, radially compressing inner seal member 42 might reduce manufacturing and/or assembling tolerances regarding the length and circumferential dimension of outlet port 26 and/or endcap 32 while maintaining suitable sealing between inlet and outlet ports 24, 26.

As shown in FIG. 2, first endcap 32 may include a plurality of first recesses 62 formed within fifth wall 58. First recesses 62 may include apertures through which outer seal member 42 may extend. First endcap 32 may also include a plurality of second recesses 64 formed within flange 52. Second recesses 64 may include cavities within which inner seal member 44 may extend. Outer and inner seal members 42, 44 may respectively extend into first and second recesses 62, 64 during a method of making first endcap 32. Specifically, first endcap 32 may be formed by injecting molten material into one or more first molds and allowing the molten material to solidify, i.e., formed via one or more injection molding processes. The shape and contour of the first molds may provide one or more features of the first endcap 32, such as, first, second, third, fourth, and/or fifth walls 46, 48, 50, 54, 58, flange 52, projections 56, and/or first and/or second recesses 62, 64. Within the first molds and/or within one or more additional molds, outer and inner seal members 42, 44 may be formed by injecting molten material into the additional molds and allowing the molten material to solidify, i.e., via one or more injection molding processes, to form outer and inner seal members 42, 44 respectively adjacent fifth wall 58 and flange 52. As such, the molten material of outer and inner seal members 42, 44 may respectively flow into first and second recesses 62, 64 and may integrally connect and form a connection with outer and inner seal members 42, 44 and the remainder of first endcap 32, respectively. It is contemplated that first and second recesses 62, 64 may include apertures, cavities, any quantity, any shape, and/or may or may not be evenly spaced about longitudinal axis 18. It is also contemplated that endcap 32 may or may not fully solidify before outer and inner seal members 42, 44 are formed.

With reference again to FIGS. 1 and 2, first endcap 32 may also include an anti-prefill device 66 configured to reduce and/or prevent unfiltered fluid from flowing into interior space 40 during a priming process. Device 66 may include a plurality of wall portions 68 each having a first end attached to first wall 46 and extending therefrom in direction B. First wall portions 68 may define a plurality of apertures 70 spaced between adjacent ones of wall portions 68. That is, first wall portions 68 may establish a first radially facing wall having apertures 70 therein. Device 66 may also include a cap portion 74 attached to wall portions 68 at ends thereof, opposite the ends attached to first wall 46. Device 66 may also include a generally cylindrical wall 72 disposed radially within wall portions 68 with respect to longitudinal axis 18. Wall 72 may be attached at one end thereof to first wall 46 and may extend in direction B. The end of wall 72 opposite the end attached to first wall 46 may be axially spaced any distance from an inner surface of cap portion 74 and the radially outer surface of wall 72 may be radially spaced any distance from the inner radial surfaces of wall portions 68. It is contemplated that when fluid filter system 10 is assembled, device 66 may extend into and may be radially surrounded by outlet port 26. It is also contemplated that anti-prefill device 66 may be omitted, and first endcap 32 may alternatively include one or more apertures configured to allow fluid flow from interior space 40 toward outlet port 26.

INDUSTRIAL APPLICABILITY

The disclosed fluid filter system may be applicable to filter any type of fluid and may provide a seal between a flow of unfiltered fluid and a flow of filtered fluid without requiring numerous, complex shaped components and/or components requiring high manufacturing tolerances. The operation of fluid filter system 10 is explained below.

Referring to FIG. 1, fluid filter system 10 may receive unfiltered fluid into inlet port 24, e.g., a first flow region, from one or more upstream components of a fluid system. The unfiltered fluid may flow from inlet port 24 radially outward along and may be directed by first endcap 32 to flow toward apertures 57. The unfiltered fluid may flow through one or more of apertures 57 in, for example, a substantially axial direction through first endcap 32, and into the radial space between container 14 and filter medium 34. The unfiltered fluid may then flow generally radially through filter medium 34 and filter medium 34 may trap particles suspended within the unfiltered fluid to thereby filter the fluid. The filtered fluid may then flow through apertures 37 and thus through sleeve 36 and into interior space 40. The filtered fluid may also flow from interior space 40 through device 66, e.g., through wall 72, into the space between wall 72 and wall portions 68, and through apertures 70. The filtered fluid may further flow into outlet port 26, e.g., a second flow region, and toward one or more downstream components of the fluid system.

It may be desirable to replace filter assembly 16 because filter medium 34 may be saturated with trapped particles, inner and outer seal members 42, 44 may be deteriorated, a maintenance period has elapsed, and/or because of any other rationale known in the art. An operator may unthread container 14 from base 12, may extract the old or used filter assembly 16 from within container 14 and may insert a new or unused filter assembly 16 into container 14. As such, outer and inner seal members 42, 44 may be unseated as the old first endcap 32 is removed with the old filter assembly 16. The operator may insert a new filter assembly 16 into container 14 and may rethread container 14 to base 12 and, as such, outer and inner seal members 42, 44 may be seated as the new first endcap 32 aligns with base 12. It is contemplated that the operator may remove some or all of the fluid retained within container 14 in conjunction with and/or after removing old filter assembly 16. It is also contemplated that operator may replace any one or more elements of filter assembly 16, e.g., may replace just filter medium 34 and end cap 32 instead of replacing all elements of filter assembly 16.

The operator may prime container 14 after inserting a new filter assembly 16 and before rethreading container 14 to base 12. As such, the operator may fill the radial space between container 14 and filter medium 34 with fluid by, for example, pouring fluid through apertures 57 and/or on the top surface of first endcap 32, e.g., the surface of wall 46 facing and/or exposed to inlet port 24. The priming fluid may or may not be filtered and device 66 may reduce and/or prevent the fluid from entering interior space 40. Specifically, as the operator pours the priming fluid, some of the priming fluid may flow radially outward toward apertures 57, through apertures 57, and into the radial space between filter medium 34 and container 14. If an operator pours an excessive volume of priming fluid through apertures 57 and thus overfills the radial space between container 14 and filter medium 34, if an operator does not directly pour the priming fluid through apertures 57 but generally pours priming fluid onto first endcap 32, and/or as a result of operator carelessness, e.g., splashing or splattering, some of the priming fluid may flow radially inward over flange 52 and/or be deposited radially within flange 52. Such deposited fluid may flow toward device 66, through apertures 70, and may be restrained from flowing into interior space 40 by cylindrical wall 72.

It is contemplated that cylindrical wall 72 may axially extend from first wall 46 a distance greater than a distance that flange 52 axially extends from first wall 46 and that apertures 57 may be axially disposed closer to container 14 than flange 52. As such, the priming fluid may flow radially outward over flange 52, through apertures 57, and into the space between container 14 and filter medium 34 or overflow wall 28 of container 14 rather than overflowing cylindrical wall 72 and flowing into interior space 40. It is also contemplated that some priming fluid may be retained radially between flange 52 and cylindrical wall 72, which may be trapped within outlet port 26 after container 14 and filter assembly 16 are interconnected with base 12. The amount of such a trapped priming fluid might be significantly less than an amount which might otherwise flow into interior space 40 if device 66 was omitted. It is further contemplated that the relative axial relation between outer and inner seal members 42, 44 may additionally assist or improve fluid flow toward apertures 57 during priming by promoting radial outward fluid to flow from inner seal member 44 toward outer seal member 42 and resisting radial inward fluid flow from outer seal member 42 toward inner seal member 44.

As container 14 and filter assembly 16 are interconnected with base 12, outer seal member 42 may form a seal between base 12 and container 14, e.g., between fluid filter system 10 and the environment and inner seal member 44 may form a seal between inlet port 24 and outlet port 26, e.g., between the unfiltered and filtered fluid flows. Specifically, outer seal member 42 may be positioned atop outer wall 28 and compressed as a function of container 14 being threadingly engaged with base 12 and may, for example, be compressed between container 14 and base 12 to establish one or more axially facing seal interfaces, e.g., a face seal against an axially facing surface of container 14 and/or base 12. It is contemplated that outer seal member 42 may be compressed against either or both of container 14 or base 12 and that outer seal member 42 may additionally and/or alternatively establish a radially facing seal interface with respect to either or both of container 14 or base 12. Additionally, inner seal member 44 may be aligned with outlet port 26 and may move past an end thereof as container 14 is threadingly engaged with base 12, may be compressed as a function of the distance between the radially facing inner surface of flange 52 and the radially facing outward surface of outlet port 26, and may, for example, be compressed therebetween to establish a radially facing seal interface, e.g., a face seal against a radial surface of outlet port 26.

Because outer and inner seal members 42, 44 may be integral with first endcap 32, container 14 and filter assembly 16 may be sealed with respect to base 12 and fluid filter system 10 may include a less complex fluid filter system. Additionally, because first endcap 32 includes device 66, unfiltered fluid may be reduced or prevented from flowing into interior space 40 during priming of container 14 during filter replacement.

It will be apparent to those skilled in the art that various modifications and variations can be made to the disclosed fluid filter system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A method of sealing a filter with respect to a base and sealingly separating a first fluid flow from a second fluid flow radially outward of the first fluid flow, the method comprising:
    establishing a first radially facing seal interface radially between the first and second fluid flows via a first seal member;
    establishing a second radially facing seal interface radially outward of the second fluid flow via a second seal member; and
    directing the first fluid flow from a central interior space of the filter to the base via an anti-prefill device associated with an opening of the central interior space, the anti-prefill device having a tubular wall and a cap portion spaced axially from the tubular wall and disposed over the opening of the central interior space, wherein the first fluid flow is directed to the base via the cap portion, such that the fluid flows axially through the tubular wall and thereafter radially around the cap portion.

2. The method of claim 1, wherein the tubular wall includes a cylindrical wall of the anti-prefill device, and the cylindrical wall extends in a direction axially away from the filter and substantially perpendicular to the cap portion.

3. The method of claim 1, wherein the second fluid flow is directed toward the filter and the first fluid flow is directed from the filter.

4. The method of claim 1, further including establishing an axially facing seal interface radially outward of the second fluid flow.

5. The method of claim 1, further including compressing the first seal member as a function of a distance between first and second radially facing surfaces.

6. The method of claim 1, wherein the first and second fluid flows are configured to flow through an endcap.

7. The method of claim 1, wherein the first and second seal members are integrally attached to an endcap.

8. The method of claim 1, wherein the filter is a fuel filter, one of the first and second fluid flows is a flow of unfiltered fuel, and the other one of the first and second fluid flows is a flow of filtered fuel.

9. The method of claim 1, further including establishing a third radially facing seal interface radially between the first and second seal interfaces, wherein the first radially facing seal interface is established via a first portion of the first seal member, and wherein the third radially facing seal interface is established via a second portion of the first seal member opposite the first portion.

10. The method of claim 9, wherein the second portion of the first seal member is engaged with an inward radially facing surface of an endcap connected to the filter.

11. The method of claim 9, wherein a third portion of the first seal member is engaged with an axially facing surface of the endcap.

12. The method of claim 1, wherein the anti-prefill device has a plurality of wall portions establishing a radially facing wall including apertures, wherein the first fluid flow passes to the base via at least one aperture of the plurality of apertures.

13. The method of claim 12, further including directing the first fluid flow to pass through the at least one aperture in a substantially radial direction.

14. The method of claim 12, further including directing the first fluid flow to pass through a cylindrical wall of the anti-prefill device, the cylindrical wall being disposed radially inward of the radially facing wall and extending in a direction axially away from the filter.

15. The method of claim 1, wherein at least part of the first seal member is spaced a first axial distance from the filter, and at least part of the second seal member is spaced a second axial distance from the filter, the first axial distance being greater than the second axial distance.

16. The method of claim 1, wherein the first fluid flow is directed to travel in a substantially radial direction by the cap portion.

17. A method of sealing a filter with respect to a base and sealingly separating a first fluid flow from a second fluid flow radially outward of the first fluid flow, the method comprising:

establishing a first radially facing seal interface radially between the first and second fluid flows via a first seal member;

establishing a second radially facing seal interface radially outward of the second fluid flow via a second seal member; and directing the first fluid flow from a central interior space of the filter to the base via an anti-prefill device associated with an opening of the central interior space, the anti-prefill device having a tubular wall and a cap portion spaced axially from the tubular wall and disposed over the opening of the central interior space, wherein the first fluid flow is directed to the base via the cap portion, such that the fluid flows axially through the tubular wall and thereafter radially around the cap portion, wherein the second fluid flow is directed toward the filter and the first fluid flow is directed from the filter, and wherein the anti-prefill device is configured to permit the first fluid flow from the filter via the opening of the central interior space and substantially prevent fluid from flowing toward the opening of the central interior space.

18. The method of claim 17, further including, via the anti-prefill device, preventing unfiltered fluid from flowing into the central interior space of the filter via the opening of the central interior space during priming of the filter.

19. A method of sealing a filter with respect to a base and sealingly separating a first fluid flow from a second fluid flow radially outward of the first fluid flow, the method comprising:

establishing a first radially facing seal interface radially between the first and second fluid flows via a first seal member;

establishing a second radially facing seal interface radially outward of the second fluid flow via a second seal member; and directing the first fluid flow from a central interior space of the filter to the base via an anti-prefill device associated with an opening of the central interior space, the anti-prefill device including a tubular wall and a cap portion spaced axially from the tubular wall and disposed axially over and perpendicular with respect to the opening of the central interior space, such that the first fluid flow includes fluid flowing axially through the tubular wall and radially around the cap portion.

20. The method of claim 19, further including, via the anti-prefill device, preventing unfiltered fluid from flowing into the central interior space of the filter via the opening of the central interior space during priming of the filter.

21. The method of claim 1, wherein the cap portion is configured such that the first fluid flow does not cause deflection of the cap portion as the fluid flows radially around the cap portion.

22. The method of claim 17, wherein the cap portion is configured such that the first fluid flow does not cause deflection of the cap portion as the fluid flows radially around the cap portion.

23. The method of claim 19, wherein the cap portion is configured such that the first fluid flow does not cause deflection of the cap portion as the fluid flows radially around the cap portion.

* * * * *